Patented Jan. 13, 1925.

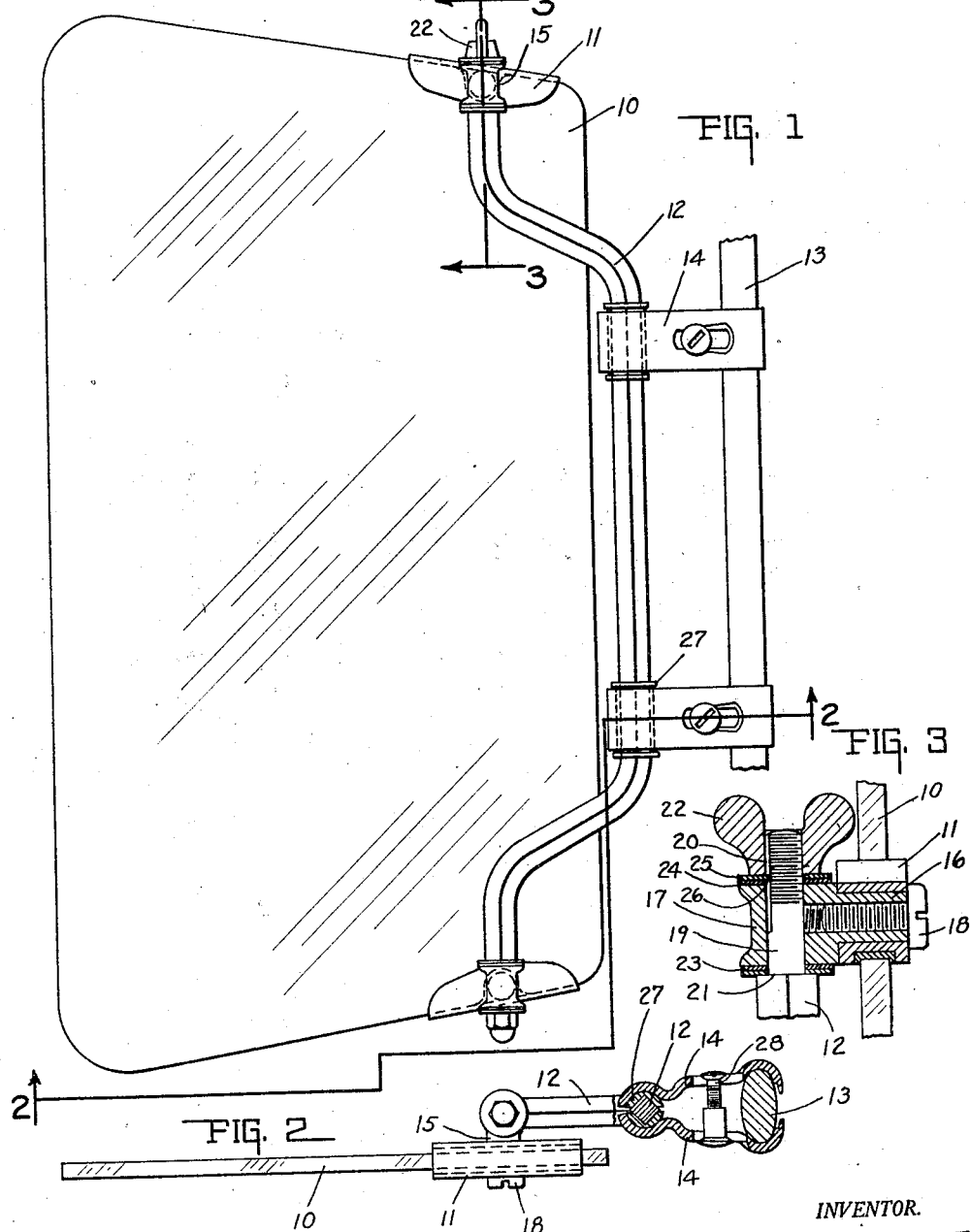

1,522,476

UNITED STATES PATENT OFFICE.

NEIL T. ALBRIGHT, OF KOKOMO, INDIANA.

WINDSHIELD WING.

Application filed October 28, 1922. Serial No. 597,555.

*To all whom it may concern:*

Be it known that I, NEIL T. ALBRIGHT, a citizen of the United States, and a resident of Kokomo, county of Howard, and State of Indiana, have invented certain new and useful Windshield Wings; and I do hereby declare that the following is a full, clear, and exact description thereof, reference being had to the accompanying drawings, in which like numerals refer to like parts.

This invention relates to a wind shield wing adapted to be adjustably secured on each side of the wind shield of a vehicle so as to be adjustable laterally with respect thereto, whereby wind may be deflected about the ends of the wind shield into or away from the vehicle body.

The feature of the invention resides in the universal adjustment of the glass shield securing bracket. Such universal adjustment of the bracket enables the same to be adapted to fit a glass panel or shield having its ends extending at various angles. Heretofore wings of this character, wherein the glass is secured by the engagement of the top and bottom edges in channel brackets secured upon the supporting rod, have not been replaceable when broken excepting wherein the angular relation of the top and bottom edges is the same as the removed glass. Furthermore, the glass panel could not be replaced by a panel of different design, wherein it would be desirable for application to varying types of vehicles. By means of this invention the universal mounting, and more particularly the lateral pivotal mounting of the bracket, enables the same to be readily adjusted to fit a new glass, particularly when the angular relation of the ends thereof has been changed to be more adaptable to a particular type of vehicle. Such construction further enables the manufacturer to use the same bracket and fittings for glass panels of varying shapes, designs and sizes to better conform to a particular vehicle.

The full nature of the invention will be understood from the accompanying drawings and the following description and claims.

In the drawings, Fig. 1 is a side elevation of the wind shield wing. Fig. 2 is a section taken on the line 2—2 of Fig. 1. Fig. 3 is a section taken on the line 3—3 of Fig. 1.

In the drawings there is shown a wind shield wing comprising a glass panel or wing member 10 having its upper and lower edges extending at an angle to each other and its lateral edges parallel. Said panel is secured in the usual manner between the channel brackets 11 which embrace a portion of the top and bottom edges. The brackets 11 are pivotally mounted on each end of the supporting rod 12, in a manner hereinafter to be described more in detail. The rod 12 is rectangular in cross section, as shown in Fig. 2, and is pivotally supported upon the wind shield frame 13 by the clamps 14.

In order that a glass panel having its top and bottom edges extending at any desired angular relation may be mounted between the channel brackets 11, the same are mounted upon the rod so as to be adjustable longitudinally, or about a laterally extending axis. For this purpose the bracket 11 is provided with a laterally extending opening which extends through a suitable recess in the edge of the glass shown in dotted lines at 15 for providing a bearing for the projecting barrel 16, extending laterally from and formed integral with the head 17. The barrel is provided with an internally screw threaded opening extending centrally thereof into which a locking screw 18 may be screwed, so that the head thereof engages the opposite side of the bracket 11 from the head 17. This permits the bracket 11 to be rotatably and removably secured to the head 17 so that when said head is held in fixed position upon the supporting rod 12, said bracket may be turned to varying positions about the barrel 16.

Each end of the supporting rod 12 is reduced, as at 19, so as to extend through a suitable vertical opening in the head 17 which extends at right angles to the barrel 16. Said reduced portion 19 is threaded at its upper end and is provided with a longitudinal slot 20. Between the reduced portion 19 and the body of the rod 12 there remains a shoulder 21 which abuts one side of the head 17 against which it is locked by the nut 22 which is screwed upon the threaded end thereof. Between the shoulder 21 and one end of the head 19, there is a pair of washers 23, and between the other end of said head and nut 22, there is a washer 24. Adjacent the washer 24, there is a washer 25 having a radially and inwardly extending projection 26 adapted to engage in the slot 20 for preventing its turning about the reduced end of said rod. By means of this arrangement the head 17, the attached bracket 11 and the shield 10 are permitted to turn about the reduced portion 19 of said rod as an axis, whereby said bracket when disconnected from the glass panel has a universal movement with respect to said rod. The wing being so mounted upon each end of the rod 12 may be turned laterally to substantially any desired position about the reduced end portions thereof as an axis. The nut 22 may be readily loosened or tightened upon the reduced end 19 so as to clamp against the head 17 and frictionally lock the same upon the rod so as to hold the wing in adjusted position. However, said nut may be tightened only sufficiently to hold it against ordinary movement and still permit it to be forcibly adjusted. The tongued washer 25 upon such adjustment of the nut will prevent the turning thereof, with respect to the screw threaded reduced portion 19 when the wing is forcibly moved back and forth, and its consequent loosening. This is affected by reason of the fact that the washer 25 is locked to the reduced end 19 upon which the nut is screwed, so that the nut and washer will remain in fixed relation with the rod while the wing and head 17 turn thereon, the friction being exerted during such movement between the head and washer 25 instead of between the head and the nut.

In order to provide the wing with a double pivotal movement with respect to the wind shield, the same may not only be turned about the ends of the rod, but the rod 12 in turn may be turned with respect to the brackets 14. Said rod having an irregular outer surface is provided with a split sleeve 27 adapted to be mounted thereon so as to embrace the irregular surface. The sleeve 17 is provided with an inner surface to correspond in shape to the outer surface so as to fit snugly thereon while its outer surface is circular in cross section. The clamp 14 is clamped about the split sleeve so as to fit snugly on the outer cylindrical bearing surface thereof for permitting said rod and sleeve to turn therein. The opposite end of the clamp 14 from that embracing the sleeve 27 is arranged to engage and clamp the wind shield post 13, said clamp being secured in clamping position on said wind shield and sleeve by means of the clamping screw 28. The adjustment of said screw increases or decreases the frictional engagement between the clamp and sleeve.

The invention claimed is:

1. In a device of the class described, a rod, a reduced portion at one end of said rod constituting a bearing, a head rotatably mounted on said bearing, an offset bearing carried by said head and disposed at right angles thereto, the said offset bearing having a threaded bore, a channel member rotatably supported by said offset bearing, a screw in said bore having the head thereof engaged with said channel member, and a nut on said reduced member to hold said head against rotation thereon.

2. In a device of the class described, a rod, a head carried by said rod, an offset bearing member disposed at right angles to said head, the said member having a threaded bore, a shield clamp rotatably carried by said bearing member, and a screw in said bore, the head of said screw being of greater diameter than said bearing member whereby the same is engageable with said shield clamp.

In witness whereof, I have hereunto affixed my signature.

NEIL T. ALBRIGHT.